(12) United States Patent
Oshiro et al.

(10) Patent No.: US 7,296,241 B2
(45) Date of Patent: Nov. 13, 2007

(54) SYSTEM AND METHOD FOR MANAGING A MESSAGE VIEW

(75) Inventors: Marc Seiji Oshiro, Seattle, WA (US); Louis Wang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 652 days.

(21) Appl. No.: 10/274,356

(22) Filed: Oct. 18, 2002

(65) Prior Publication Data

US 2004/0075687 A1 Apr. 22, 2004

(51) Int. Cl.
*G06F 17/00* (2006.01)
(52) U.S. Cl. .................. 715/778; 715/779; 715/805; 715/818
(58) Field of Classification Search ........... 715/752, 715/747, 748, 744, 716, 700, 778, 779, 805, 715/781, 818–820
See application file for complete search history.

(56) References Cited

U.S. PATENT DOCUMENTS

| | | | | |
|---|---|---|---|---|
| 5,371,788 | A * | 12/1994 | Baals et al. ................. | 379/396 |
| 5,751,793 | A * | 5/1998 | Davies et al. ............ | 379/88.11 |
| 5,796,394 | A * | 8/1998 | Wicks et al. ................ | 715/751 |
| 5,841,855 | A * | 11/1998 | Davidson et al. .......... | 379/396 |
| 5,872,521 | A * | 2/1999 | Lopatukin et al. ........ | 340/7.52 |
| 6,333,973 | B1 * | 12/2001 | Smith et al. ............. | 379/88.12 |
| 6,389,124 | B1 * | 5/2002 | Schnarel et al. ....... | 379/142.01 |
| 6,408,191 | B1 * | 6/2002 | Blanchard et al. .......... | 455/566 |
| 6,463,078 | B1 | 10/2002 | Engstrom et al. ........... | 370/466 |
| 6,625,447 | B1 * | 9/2003 | Rossmann ............... | 455/426.1 |
| 6,763,226 | B1 * | 7/2004 | McZeal, Jr. ................ | 455/90.2 |
| 6,778,642 | B1 * | 8/2004 | Schmidt et al. .......... | 379/88.13 |
| 6,879,828 | B2 * | 4/2005 | Virtanen et al. ......... | 455/426.1 |
| 2003/0013483 | A1 * | 1/2003 | Ausems et al. ............. | 455/556 |
| 2003/0038825 | A1 * | 2/2003 | Wen et al. .................. | 345/700 |
| 2003/0063779 | A1 * | 4/2003 | Wrigley ..................... | 382/116 |
| 2003/0152203 | A1 * | 8/2003 | Berger et al. ............ | 379/93.24 |
| 2005/0114796 | A1 * | 5/2005 | Bast .......................... | 715/856 |

OTHER PUBLICATIONS

Sen Yoshida et al.; "Community Visualizing Agent"; Proceedings of the International Conference on the Practical Application of Intelligent Agents and Multi Agent Technology, 1998; pp. 643-644.
Ahmed Patel et al.; "A technique for multi-network access to multimedia messages"; 1997 Elsevier Science; pp. 324-337.

* cited by examiner

*Primary Examiner*—Tadesse Hailu
(74) *Attorney, Agent, or Firm*—Merchant & Gould P.C.; Ryan T. Grace

(57) ABSTRACT

Described is a system and method for managing a message view on a mobile device. The system includes a switch manager and a plurality of message stores. Message stores may include an email account, SMS account, and a MMS account. A message view may include a custom view of the message stores. An input is received that enables the switch manager to switch between one view of the message stores and another view. In one embodiment, the input is a left or right key entry. Continuous entry of the left or right key entry enables a user to switch through views of the message stores, in a deterministic approach.

22 Claims, 4 Drawing Sheets

SYSTEM AND METHOD FOR MANAGING A MESSAGE VIEW

FIELD OF THE INVENTION

The present invention relates to user interfaces, and more particularly to switching between one message view and another message view of message store.

BACKGROUND OF THE INVENTION

In the competitive marketplace, today's consumer typically selects a mobile device based on several factors, including price, features, and appearance of the mobile device. Features may include an ability to perform a variety of actions, as well as an ability to perform those actions easily and efficiently. When a particular feature in a mobile device requires complex keystrokes, or a sequence of actions that are difficult to remember or repeat, a consumer may choose a different mobile device.

Moreover, today's consumer may also desire the ability to manage a variety of accounts from a single mobile device. Such accounts may include multiple email, Short message Services (SMS), Multimedia Message Services (MMS) accounts, and the like. If the ability to manage those accounts on the mobile device is complex or inefficient, the consumer's frustration may quickly grow. Therefore, it is with respect to these considerations and others that the present invention has been made.

SUMMARY OF THE INVENTION

This summary of the invention section is intended to introduce the reader to aspects of the invention and is not a complete description of the invention. Particular aspects of the invention are pointed out in other sections herein below, and the invention is set forth in the appended claims, which alone demarcate its scope.

The present invention provides a system, apparatus, and method for switching between one view and another view of information associated with message store. In one aspect of the present invention, a computer-implemented method is directed to managing a message view. The method includes receiving an input. If the received input is a next instruction, the method displays a next message view associated with a plurality of message stores. If the received input is a previous instruction, the method displays a previous message view associated with the plurality of message stores.

In another aspect of the present invention, a computer-readable medium is encoded with computer-executable components, including a plurality of message stores and a switch manager. The plurality of message stores are configured to store information associated with at least one of an email account, Short message Service (SMS) account, and a Multimedia Message Service (MMS) account. The switch manager is configured to receive an input. If the received input is a next instruction, the switch manager displays a next message view associated with a plurality of message stores. If the received input is a previous instruction, the switch manager displays a previous message view associated with the plurality of message stores.

In still another aspect of the present invention, in a computer device having a graphical user interface and a user selection interface mechanism, a method is directed to managing a message view. The method includes receiving a user selection, and if the user selection is a next instruction, displaying a next message view associated with a plurality of message stores. If the user selection is a previous instruction, the method includes displaying a previous message view associated with the plurality of message stores.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the term "connected" means a direct connection between the things that are connected, without any intermediary devices or components.

The term "coupled," means a direct connection between the things that are connected, or an indirect connection through one or more either passive or active intermediary devices or components.

The meaning of "a," "an," and "the" include plural references. The meaning of "in" includes "in" and "on." Additionally, a reference to the singular includes a reference to the plural unless otherwise stated or is inconsistent with the disclosure herein.

Briefly stated, the present invention is directed to a system and method for switching between one view and another view of information associated with message stores. message stores may include message information associated with an email account, Short message Services (SMS) account, Multi-media Message Services account (MMS), and the like. A view may include a custom view of message information associated with the message stores. The custom view enables selection of message information, based an unread message, all messages, and the like. A home view identifies a list of available message stores that may be viewed. In one embodiment, the invention enables a user to enter a 'right' or 'left' key to switch from a current message view to another message view. The right key enables a switch from the current message view to a next message view of information associated with the message stores. The left key enables a switch from the current message view to a previous message view of information associated with the message stores. Continuous entry of the left or right key enables the user to sequence cyclically through views associated with the message stores in a deterministic approach. Employing the left and right key entries enables the present invention to minimize use of such traditional approaches to manage message views, including menus, tree structures, and the like.

Illustrative Operating Environment

Figure 1:
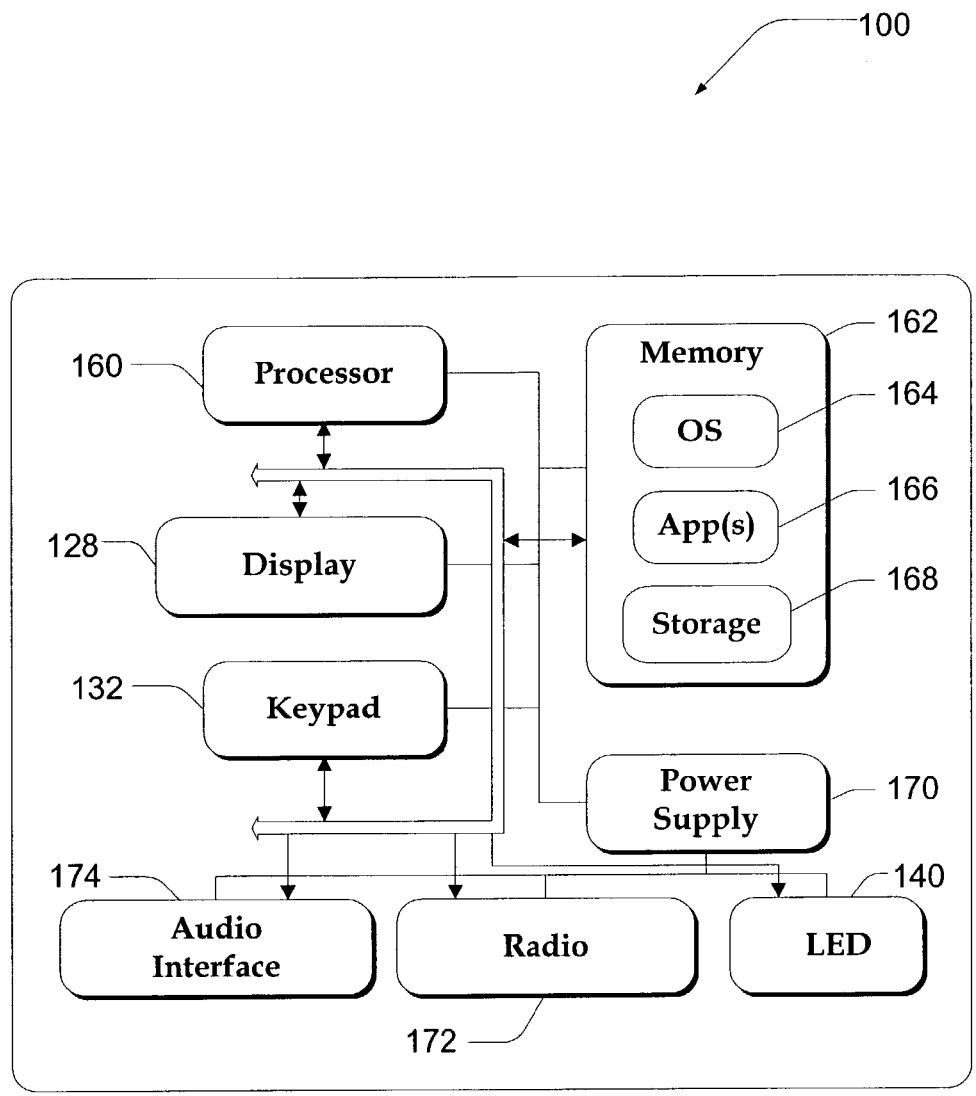
FIG. 1 is a functional block diagram illustrating an embodiment of an exemplary communications device for practicing the present invention.

FIG. 1 is a functional block diagram illustrating an embodiment of an exemplary communications device 100 for practicing the present invention. In one embodiment of the present invention communications device 100 is implemented as a mobile communications device, such as a personal digital assistant (PDA), smart phone, and the like. Communications device 100 may also include handheld computers, personal computers, multiprocessor systems, microprocessor-based or programmable consumer electronics, network PCs, wearable computers, and the like.

Communications device 100 may include many more components than those shown in FIG. 1. The components shown, however, are sufficient to disclose an illustrative embodiment for practicing the invention.

As shown in the figure, communications device 100 includes processor 160, memory 162, display 128, and keypad 132. Memory 162 generally includes both volatile memory (e.g., RAM) and non-volatile memory (e.g., ROM, Flash Memory, or the like). Communications device 100 includes an operating system 164, such as the Windows CE operating system from Microsoft Corporation or other such operating system, which is resident in memory 162 and executes on processor 160. Keypad 132 may be a push button numeric dialing pad (such as on a typical telephone), a multi-key keyboard (such as a conventional keyboard). Display 128 may be a liquid crystal display, or any other type of display commonly used in mobile computing devices. For example, display 128 may be touch-sensitive, and would then also act as an input device.

One or more application programs 166 are loaded into memory 162 and run on the operating system 164. Examples of application programs include phone dialer programs, switch manager, email programs, scheduling programs, word processing programs, spreadsheet programs, and so forth. Communications device 100 also includes non-volatile storage 168 within memory 162. Non-volatile storage 168 may be used to store persistent information which should not be lost if the communications device 100 is powered down. The application programs 166 may use and store information in storage 168, such as e-mail, SMS, MMS, or other messages used by an e-mail application, appointment information used by a scheduling program, documents used by a word processing application, and the like. A synchronization application may also reside on communications device 100 and is programmed to interact with a corresponding synchronization application resident on a host computer to keep the information stored in storage 168 synchronized with corresponding information stored at the host computer.

Communications device 100 also includes power supply 170, which may be implemented as one or more batteries. Power supply 170 might further include an external power source, such as an AC adapter or a powered docking cradle that supplements or recharges the batteries.

Communications device 100 is also shown with two types of external notification mechanisms: LED 140 and audio interface 174. These devices may be directly coupled to power supply 170 so that when activated, they remain on for a duration dictated by the notification mechanism even though processor 160 and other components might shut down to conserve battery power. LED 140 may be programmed to remain on indefinitely until the user takes action to indicate the powered-on status of the device. Audio interface 174 is used to provide audible signals to and receive audible signals from the user. For example, audio interface 174 may be coupled to a speaker for providing audible output and to a microphone for receiving audible input, such as to facilitate a telephone conversation.

Communications device 100 also includes radio 172 that performs the function of transmitting and receiving radio frequency communications. Radio 172 facilitates wireless connectivity between communications device 100 and the outside world, via a communications carrier or service provider. Transmissions to and from radio 172 are conducted under control of operating system 164. In other words, communications received by radio 172 may be disseminated to application programs 166 via operating system 164, and vice versa.

Radio 172 allows communications device 100 to communicate with other computing devices, such as over a network. Radio 172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
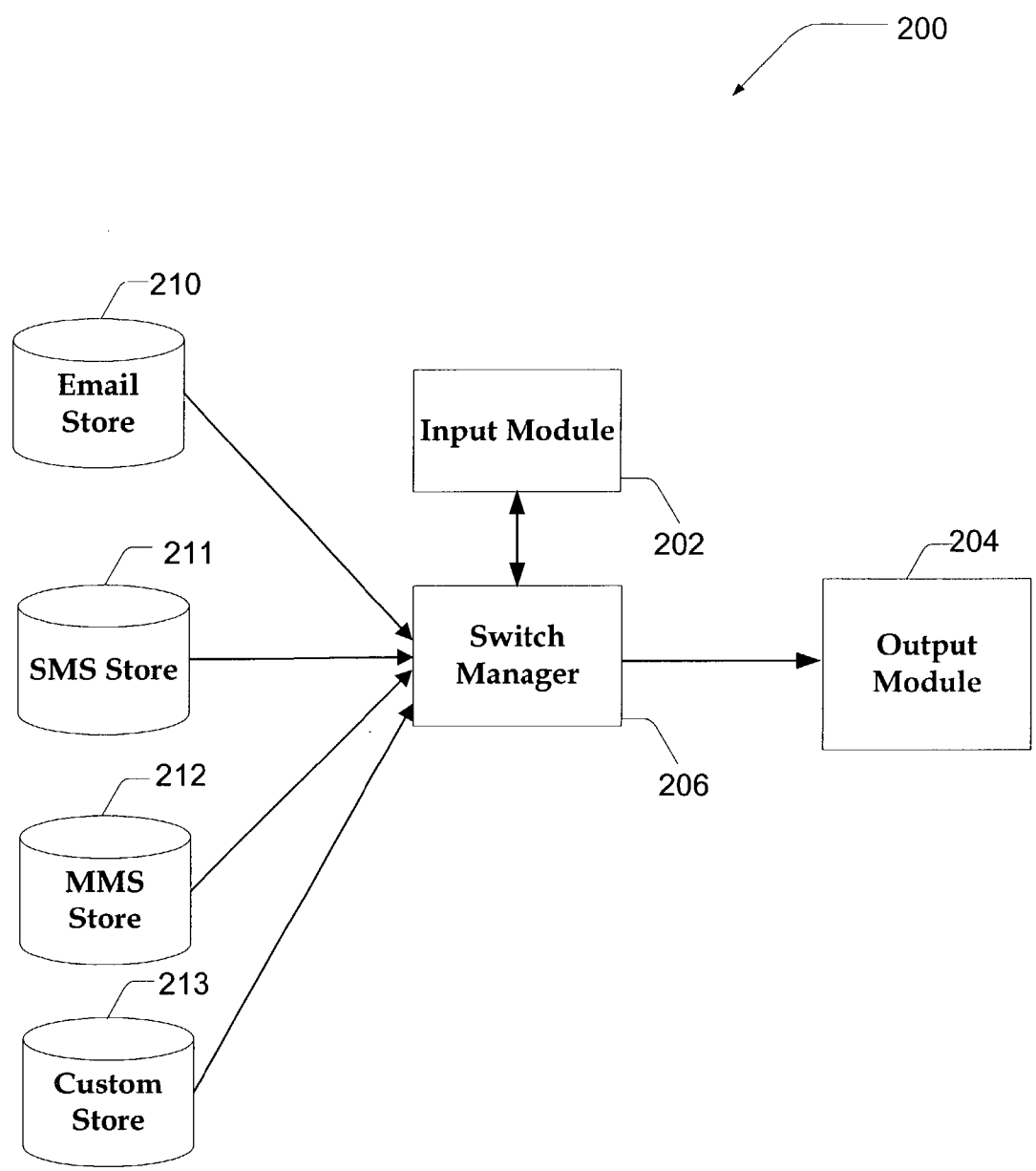
FIG. 2 is a functional block diagram of one embodiment of components in communications device 100 of FIG. 1 for switching a message view.

FIG. 2 is a functional block diagram of one embodiment of components for switching a message view, in accordance with the present invention. System 200 may be employed in communication device 100 shown in FIG. 1.

System 200 includes input module 202, output module 204, switch manager 206, email store 210, SMS store 211, MMS store 212, and custom store 213.

As shown in the figure, switch manager 206 is in communication with input module 202 and output module 204. Switch manager 206 is also in communication with email store 210, SMS store 211, MMS store 212, and custom store 213.

Input module 210 includes a keypad, touch-sensitive device, and the like configured to receive a keystroke. Input module 210 enables the user to input a variety of keystrokes, including a 'right', 'left,' 'home,' and 'action', and the like. In one embodiment, 'right', 'left,' 'home,' and 'action' are predefined hardware keys. Input module 210 is further arranged to provide the keystroke to switch manager 206.

Output module 212 includes virtually any display device that enables one to view information associated with a message store, such as email store 210, SMS store 211, MMS store 212, and the like. For example, output module 212 includes LED devices, LCD devices, printer devices, and similar display devices.

Output module 212 is configured to receive characters, bitmaps, and the like from switch manager 206. In one embodiment, the received characters include information associated with a message store.

Email store 210 is configured to provide storage for information associated with an email message. Email store 210 may include a database, a flat file, a directory structure, and the like. An email message may include text, graphics, an audio file, source indicator, and the like. Email store 210 may include an account associated with a single mail server address, including a Post Office Protocol (POP) address, Internet message Access Protocol (IMAP) server, and the like. Email store 210 may also include information associated with a plurality of email accounts that are accessible to communications device 100.

Short message Service (SMS) store 211 is configured to provide storage for information associated with a short text message. SMS store 211 may include a database, a flat file, a directory structure, and the like. An SMS message may include alphanumeric characters, source indicator information, and the like. Moreover, SMS store 211 may also include information associated with a plurality of SMS accounts that are accessible to communications device 100.

MMS store 212 is configured to provide storage for any messaging service information associated with enabling multimedia messages to communications device 100. MMS store 212 may include a database, a flat file, a directory structure, and the like. Messaging service information includes, but in not limited to, images, graphics, voice, video, and audio messages. Moreover, MMS store 212 may also include information associated with a plurality of MMS accounts.

Custom store 213 is configured to provide storage for a customize rule. Custom store 213 may include a database, a flat file, a directory structure, and the like. A customize rule includes instructions, tests, comparisons, search queries, and the like that enable a selection of a message from email store 210, SMS store 211, MMS store 212, and the like. For example, customize rule may include rules for selecting unread messages, selecting all messages, selecting high priority messages, selecting messages received from a specified source, and the like. The customize rule may be employed within a specified message store, across all message stores, and across several specified message stores. Moreover, customize rule may include virtually any condition, test, and the like that distinguishes one message from another message in the message stores.

The present invention however, is not limited to email, MMS, and SMS stores, and other information stores, databases, and the like may be employed by the invention. For example, voice mail messages, browser messages, contact databases, and the like, may be employed without departing from the scope or spirit of the present invention. Moreover, the present invention is configured to enable a message store, customized rule, and the like to be added, deleted, or modified.

Switch manager 206 includes software and related hardware that is configured to select information from a message store, and provide the information to output module 204 for display to the user. Switch manager 206 is further enabled to receive a key input from input module 202 that is configured to switch the current message view to another message view. In one embodiment, switch manager 206 is configured to receive from input module 202 a left or right key entry that enables switch manager 206 to switch between a current message view, a next message view, and a previous message view. That is, if switch manager 206 receives a right key entry, switch manager 206 is enabled to direct a message view switch from the current view to a next view of information associated with the message stores. If switch manager 206 receives a left key entry, switch manager 206 is enabled to direct a message view switch from the current view to the previous message view associated with the message stores. Switch manager 206, however, is not limited to a right and left key entry to enable switching between message views. Virtually any entry may be employed to switch message views. For example, up/down key entries, alphanumeric key entries, and the like may be employed without departing from the scope or spirit of the present invention. Additionally, if a message store is added, deleted, and modified, switch manager 206 is enabled to update the sequence of message stores.

Generalized Operation

Figure 3:
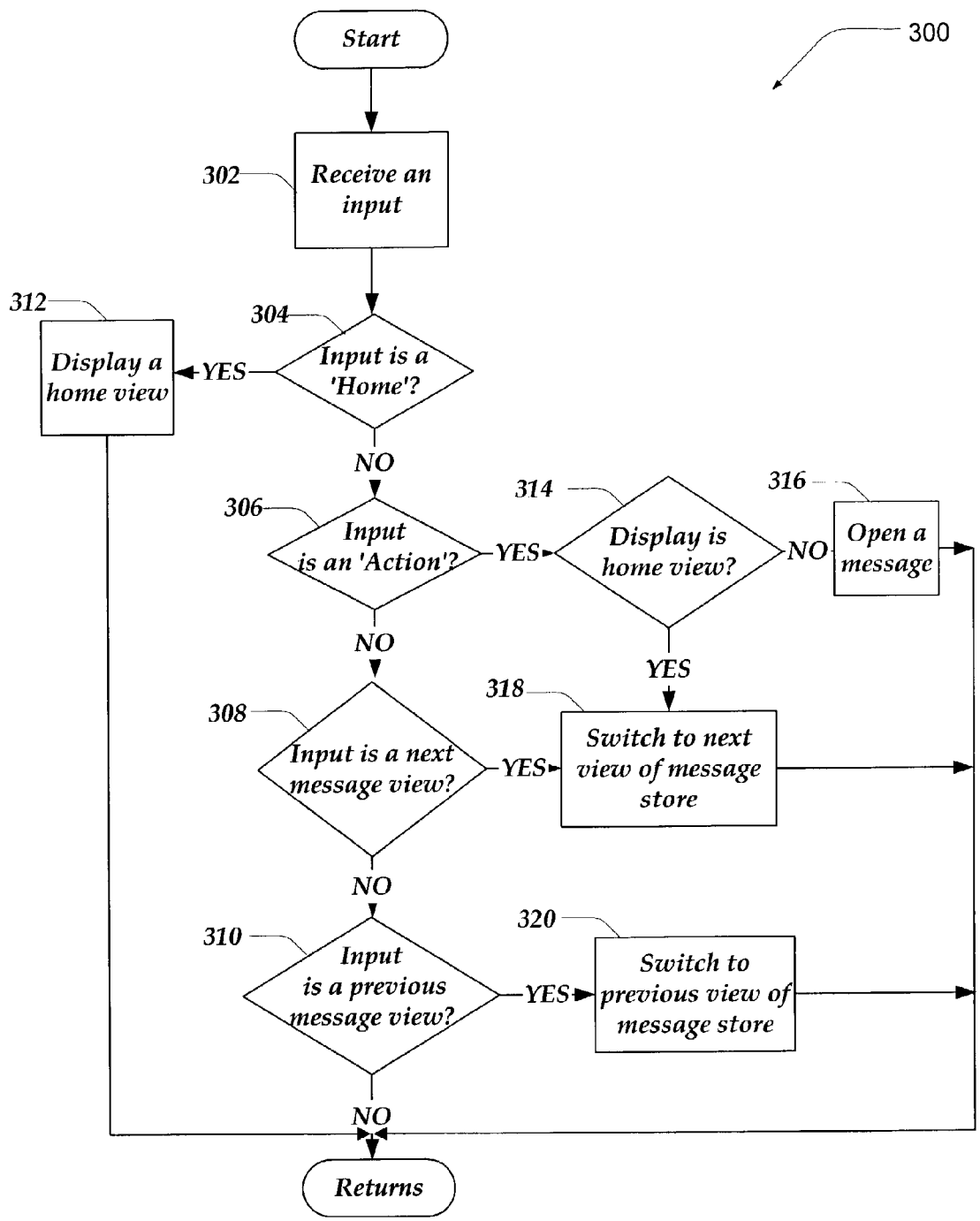
FIG. 3 is a flow diagram generally showing one embodiment of a process of switching a message view.
Figure 4:
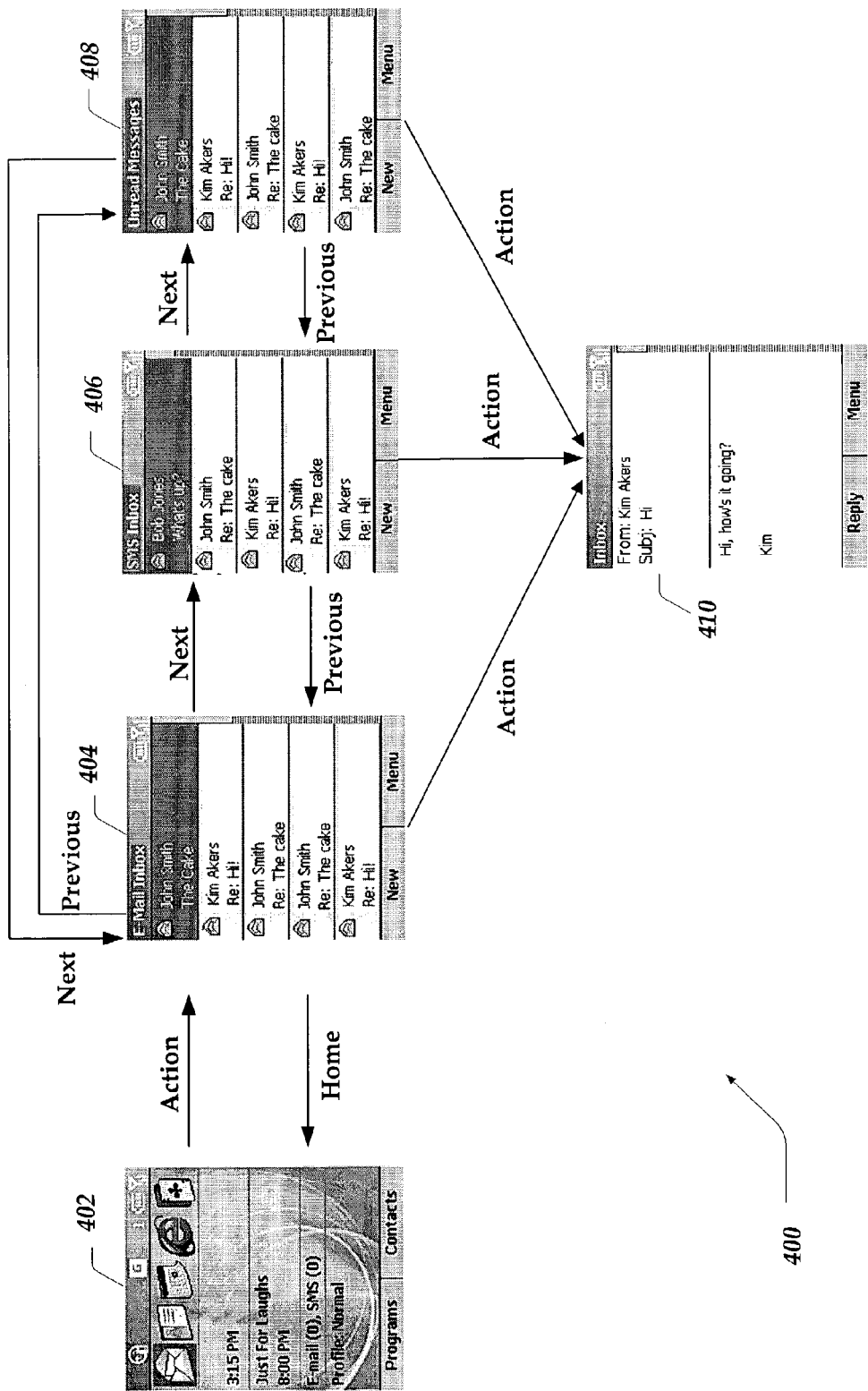
FIG. 4 is a sequence of screen shots of an embodiment for illustrating switching a message view, in accordance with the present invention.

The operation of certain aspects of the present invention will now be described with respect to FIG. 3. FIG. 3 is a flow diagram generally showing one embodiment for a process of managing a message view. Process 300 may be employed by switch manager 206 illustrated in FIG. 2. Moreover, FIG. 4 is employed to provide an illustrative example to further aid in illustrating the flowchart.

Process 300 begins, after a start block, at block 302 where an input is received. Upon receipt of the input, the process moves to decision block 304 where a determination is made whether the input is associated with a 'home' instruction. If it is determined, that the input is associated with a 'home' instruction, process 300 flows to block 312, where a home view is displayed. Briefly referring to FIG. 4, display 402 illustrates one embodiment of a home view. As shown in FIG. 4, information associated with several message stores are displayed, including a number of unread messages associated with the message stores. Upon completion of block 312, process 300 returns to performing other actions.

Alternatively, if, at decision block 304, it is determined, that the input is not associated with a 'home' instruction, process 300 continues to decision block 306, where a determination is made whether the input is associated with an 'action' instruction.

If, at decision block 306, it is determined that the input is associated with an 'action' instruction, the process flows to decision block 314, where a determination is made whether the current message view being displayed is the home view.

If, at decision block 314, it is determined that the current message view is not the home view, the process proceeds to block 316, where a current message is opened. Upon opening the current message, the process returns to performing other actions. Referring briefly to FIG. 4, block 316 is represented by a transition from message view 404, message view 406, and message view 408, to message view 410.

Alternatively, if at decision block 314, it is determined that the current message view is the home view, the process proceeds to block 318, where a switch is performed to a pre-defined first current message view. The pre-defined first current message view may include information associated with a message store, such as an email store, a custom view, and the like. Referring briefly to FIG. 4, this transition is illustrated as a transition from screen 402 to message view 404. Upon completion of block 318, the process returns to performing other actions.

Alternatively, back at decision block 306, it is determined that the input is not associated with an 'action' instruction, the process flows to decision block 308, where a determination is made whether the input is associated with a next message view instruction.

If, at decision block 308, it is determined that the input is associated with a next message view instruction, process 300 proceeds to block 318, where the current message view is cycled to a next message view. The next message view may be obtained from a pre-defined sequence of message views. If the current message view is associated with the last message view in the sequence, upon the next switch input, block 318 cycles back through the sequence of the pre-defined sequence of message views. It is noted that the pre-defined sequence of message views are configured to accommodate additions, deletions, and modifications or messages views in the sequence. Briefly, referring to FIG. 4, block 318 is illustrated as a transition from message view 404 to message view 406, message view 406 to message view 408, and from message view 408 to message view 404. Upon completion of block 318, the process returns to performing other actions.

Alternatively, if, at decision block 308, it is determined that the input is not associated with a next message view instruction, process 300 proceeds to decision block 310, where a determination is made whether the input is associated with a previous message view instruction.

If, at decision block 310, it is determined that the input is associated with a previous message view instruction, process 300 proceeds to block 320, where the current message view is switched to a previous message view in the pre-defined sequence of message views. Referring briefly to FIG. 4, block 320 is illustrated by a transition from message view 408 to message view 406, from message view 406 to message view 404, and from message view 404 to message view 408. As illustrated, the message views may be switched by a series of previous message view instructions or a series of next message view instructions. In any event, upon completion of block 320, the process returns to performing other actions. moreover, if, at decision block 310, it is determined that the input is not associated with a previous message view instruction, process 300 returns to performing other actions.

In one embodiment of process 300, a next message view instruction is associated with a 'right' key entry, while a previous message view instruction is associated with a 'left' key entry. However, the invention is not so limited, and virtually any input may be employed that enables switching through a cyclic sequence of message views.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A computer-implemented method for managing a message view for message stores, the method comprising:
    displaying a current message view that displays a list of messages from a current message store;
    receiving an input that is used to navigate between message stores, wherein the input is one member of a group comprising: a next instruction and a previous instruction;
    moving to a next message store directly from the current message store when the input is the next instruction and displaying a next message view that displays a list of messages from the next message store; and
    moving to a previous message store directly from the current message store when the input is the previous instruction and displaying a previous message view that displays a list of messages from the previous message store, wherein the current message store, the next message store and the previous message store are different message stores that are selected from the message stores.

2. The computer-implemented method of claim 1, wherein the received input is at least one member of a group comprising: a left key entry and a right key entry.

3. The computer-implemented method of claim 2, wherein the left key entry is associated with displaying the previous message view and the right key entry is associated with displaying the next message view.

4. The computer-implemented method of claim 1, wherein each of the message stores further comprises information associated with at least one member of a group comprising; an email account, a Short Message Service (SMMS) account, and a Multimedia Message Service (MMMS) account.

5. The computer-implemented method of claim 1, wherein at least one of the next message view and the previous message view further comprises a custom view of the message stores that includes a first message that is selected from a first message store and a second message from a second message store.

6. The computer-implemented method of claim 1, wherein the previous message view and next message view cyclically switches through a pre-defined sequence of message views associated with the message stores.

7. The computer-implemented method of claim 1, further comprising displaying a current message in the current message view when the received input is an action instruction.

8. An apparatus, comprising:
    message stores, wherein each of the message stores are configured to store messages that are associated with at least one member of a group comprising: an email account, a Short Message Service (SMS) account, and a Multimedia Message Service (MMS) account; and
    a switch manager coupled to the message stores, and wherein the switch manager is configured to perform actions, including:

receiving an input that is used to navigate directly between the message stores, wherein the input is at least one member of a group comprising: a next instruction and a previous instruction;

displaying a next message view that displays a list of messages from a first one of the message stores when the received input is the next instruction; and displaying a previous message view that displays a list of messages from a second one of the message stores when the received input is the previous instruction.

9. The apparatus of claim 8, wherein at least one of the next view and the previous view further comprises a custom view of the plurality of message stores.

10. The apparatus of claim 9, wherein the custom view further comprises a means for identifying a message from the plurality of message stores, wherein the identified message enables a message view.

11. The apparatus of claim 8, wherein the received input further comprises one member of a group comprising: a left key entry and a right key entry.

12. The apparatus of claim 11, wherein the left key entry is associated with displaying the previous message view and the right key entry is associated with displaying the next message view of the plurality of message stores.

13. The apparatus of claim 8, wherein the previous message view and next message view cyclically switches through a pre-defined sequence of the message stores, wherein each switch displays messages from the associated message store.

14. The apparatus of claim 8, further comprising, receiving an action instruction and in response to receiving the action instruction, displaying a current message in the current message view.

15. A computer-readable storage medium having computer-executable instructions for managing a message view, comprising:

receiving a user selection;

when the user selection is a next instruction, moving directly to a next message store from a current message store and displaying a next message view that displays a list of messages from the next message store; and when the user selection is a previous instruction, moving directly to a previous message store from a current message store and displaying a previous message view that displays a list of messages from the previous message store, wherein the next message store and the previous message store are different message stores within the message stores.

16. The computer-readable storage medium of claim 15, wherein the user selection is at least one member of a group comprising: a left key entry and a right key entry.

17. The computer-readable storage medium of claim 16, wherein the left key entry is associated with displaying the previous message view and the right key entry is associated with displaying the next message view of the message stores.

18. The computer-readable storage medium of claim 15, wherein each of the message stores include information associated with at least one member of a group comprising: an email account, Short Message Service (SMS) account, and Multimedia Message Service (MMS) account.

19. The computer-readable storage medium of claim 15, wherein at least one of the next view and the previous view further comprises a custom view of the message stores.

20. The computer-readable storage medium of claim 15, wherein the custom view further comprises a means for identifying a message from the message at ores, wherein the information enables viewing of the message.

21. The computer-readable storage medium of claim 15, wherein the previous message view and next message view cyclically switches through a pre-defined sequence of message views associated with the message stores.

22. The computer-readable medium of claim 15, further comprising, receiving an action instruction and displaying a current message in the current message view.

* * * * *